March 12, 1957 J. W. ANDERSON 2,784,503
SHAKEPROOF SCREW FASTENING
Filed June 29, 1954
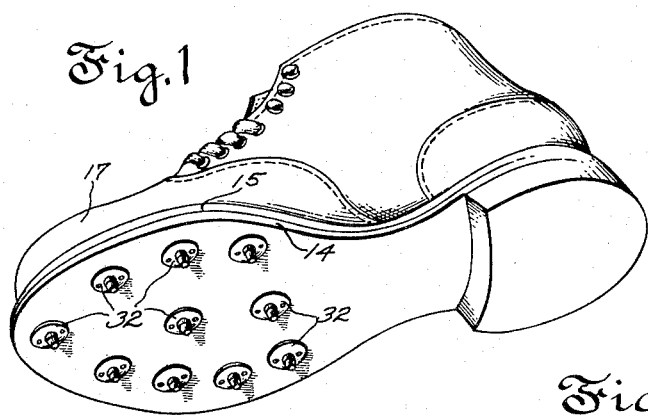
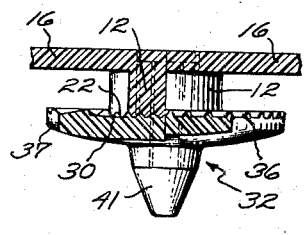
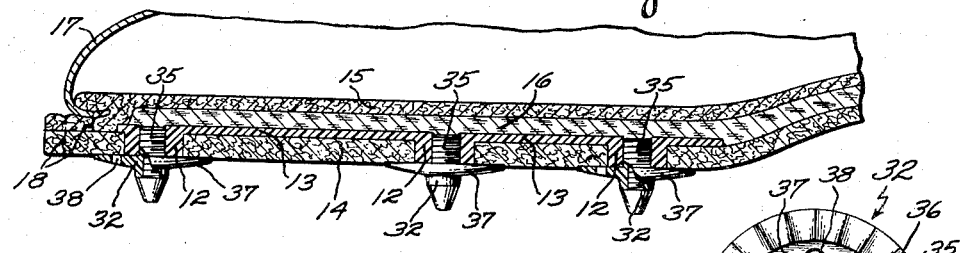
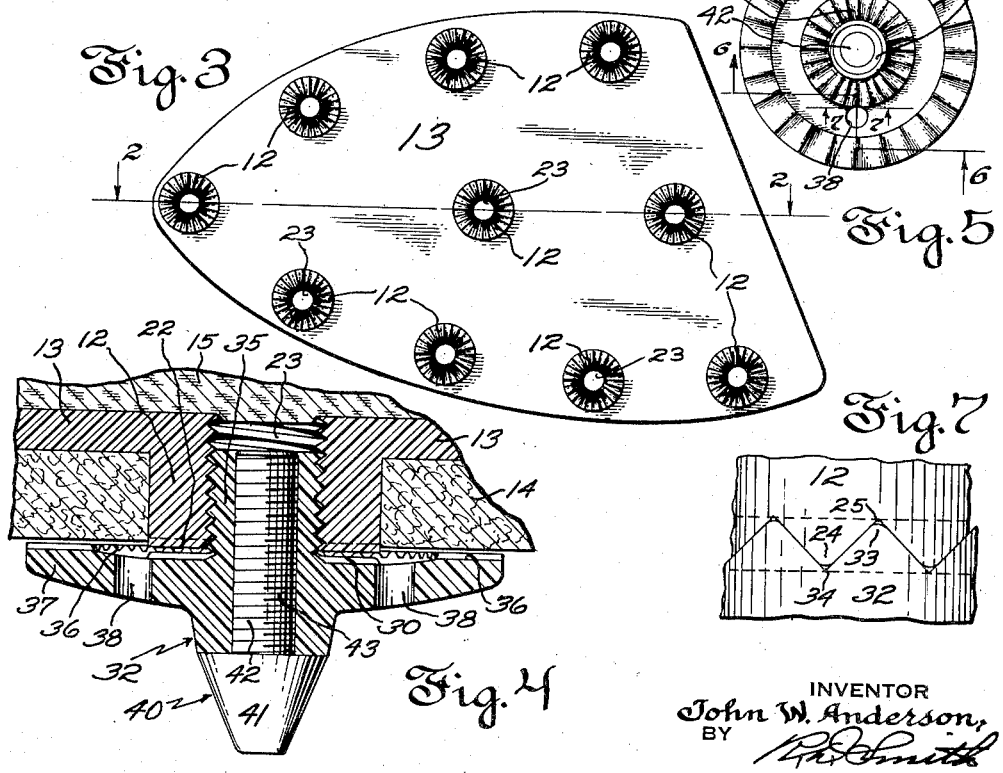
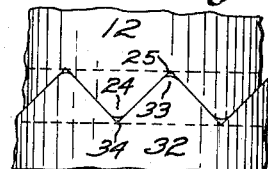
INVENTOR
John W. Anderson,
BY
ATTORNEY

United States Patent Office 2,784,503
Patented Mar. 12, 1957

2,784,503

SHAKEPROOF SCREW FASTENING

John W. Anderson, Newtown, Conn.

Application June 29, 1954, Serial No. 440,065

1 Claim. (Cl. 36—59)

This invention relates to separable fasteners comprising screw-threaded plug and socket parts that incorporate means for automatically preventing accidental loosening thereof when firmly screwed together.

An object of the invention is to utilize the property of resilience in a material of which the screw threads are formed to make possible a detentive grabbing action between meeting surfaces of the plug and socket that will oppose their relative rotation in an unscrewing or backing off direction after being tightly screwed together.

A related object is to utilize elastic stretch in the threaded wall of the plug and/or the socket to permit fully seated interengagement of mating projections and recesses respectively on the plug and on the socket as they become drawn closer and closer together in a helical path by the action of the screw threads.

A further object is to distribute alternate ridges and grooves over a considerable area of meeting surfaces of the plug and socket for increasing the detentive strength thereof without correspondingly increasing the force that is required to turn the plug and socket relatively while the ridges cam past one another.

Another object is to locate detentive ridges and grooves on abutting surfaces of the plug and socket that are disposed transversely of the common axis of their relative rotary movement.

A special use for the invention is to incorporate a plurality of the improved socket members in a common plate-like unit adapted to be embedded in the compound structure of an otherwise conventional shoe sole so that screw threaded holes in the sockets open outward at the ground surface of the outer sole of the shoe for the insertion therein of ground clinging, screw threaded spikes. By the principles of this invention such spikes will reliably be prevented from accidental unscrewing or becoming loose when applied to shoes in outdoor use such as golf shoes.

These and other objects of the invention will more fully appear in the following description of a successful embodiment of the invention having reference to the accompanying drawings wherein:

Fig. 1 is a perspective view of a golf shoe whose walking surface is equipped with sockets to receive ground spikes mounted and retained therein according to the principles of this invention.

Fig. 2 is a view taken in section centrally lengthwise through the golf shoe of Fig. 1 and on the plane 2—2 through the socket equipped plate that is shown detached from the shoe in Fig. 3.

Fig. 3 is a bottom plan view of the socket equipped plate removed from the shoe of Figs. 1 and 2 with the spikes removed therefrom.

Fig. 4 is an enlarged fragmentary view of one of the assembled spikes and sockets, the former being slightly retracted from its fully screwed-in position.

Fig. 5 is a plan view on a smaller scale showing the spike of Fig. 4 detached from its socket in the shoe.

Fig. 6 is a view taken in section on the planes 6—6 in Fig. 5 looking in the direction of the arrows showing the detentive ridges and grooves of the spike and its socket fully enmeshed.

Fig. 7 is an enlarged fragmentary view of two of the fully engaged interlocking ridges and grooves as viewed from the plane 7—7 in Fig. 5.

For illustrating the invention I have chosen to represent the socket portion of my improved fastener in the form of a hollow internally threaded boss 12. A plurality of such bosses project from one broadside face of a plate 13 that is thin enough to be as flexible as a shoe sole and which to advantage may be molded into a homogeneous and integral part inclusive of the projecting bosses 12. The outline of plate 13 will parallel and fall inside of the generally similar but larger outline of the composite shoe bottom. In other words, the plate 13 is sufficiently smaller than the shoe sole to permit the former being completely concealed when embedded within the latter or sandwiched between the outer sole 14 and an inner sole 15 of the shoe bottom. Atop the plate 13, between the inner and outer soles, there is imprisoned the usual cushioning filling of wet bound cork particles 16 or of some equivalent, squeak preventing, nondrying, cushioning substance. The attachment of the shoe upper 17 to the shoe soles may be by conventional means such as stitching 18.

The outermost face 22 of each boss 12 is a generally planar annular surface surrounding the screw threaded hole 23 that extends entirely through the boss and plate. This annular surface is provided with circumferentially alternating ridges 24 and grooves 25 that are disposed radially with respect to the axis of the threaded hole. A preferred approximate proportion of depth to width of the ridges 24 and grooves 25 is best shown in Fig. 7 where both camming sides of each ridge are seen to slope at a like angle of 45 degrees in relation to the hole axis. Where the detentive effect is desired to be firmer in one rotary direction than in the other, the camming slope of one side of each ridge may be made a steeper angle than the camming slope on the other side of the same ridge. Absolute locking instead of a yieldable detentive grab of the ridges in the grooves will result from making one side of the ridges both on the plug and on the socket parallel with their common axis of relative rotation.

A generally planar annular surface 30 on the plug portion 35 of a ground spike 32 carries ridges 33 of shape, size and disposition to fit and mate with grooves 25 in the socket 12, which ridges on the plug or spike alternate with grooves 34 therein that are of shape, size and disposition to fit and mate with ridges 24 on the socket surface 22 when the screw threaded plug portion 35 of spike 32 is screwed fully into the threaded hole 23 in boss 12.

During the final stages of mutual approach of the ribbed surfaces 30 and 22, their ridges 24 and 33 are drawn into rotary interfering engagement whereupon there takes place a rubbing action of the relatively revolving ridges against one another. If the materials of the plug and of the socket were as inelastic as metal, for instance, this interference of the ridges would positively arrest the screwing together movement of plug and socket so that the ridges could never become detentively seated in the grooves. I have discovered, however, that if the externally threaded plug portion 35 of the spike 32 and the internally threaded tubular walls of the boss 12 are made of a tough plastic material possessing high resilience and good tensile strength, such as nylon, the threaded portions of the plug and socket can, within their elastic limit, stretch axially in response to attempts of the ridges to rub past one another sufficiently to permit the ridges to pass repeatedly until they have finally become fully seated in their mating grooves. It is found that this passing of the ridges take place with somewhat of a snap action that is plainly detactable in the screwing together of the parts, As a result, and after being fully screwed together, a much more forceful turning of the plug relatively to the socket in reverse direction is required for unscrewing the plug from the socket than would be encountered in the self loosening tendency of screwed together parts due merely to shocks or vibration in use. The same ability of the threaded surfaces to stretch axially for enabling the ridges to become fully seated in the grooves likewise enable the sloping sides of the ridges, by camming against one another, to force the ridges out of their grooves for permitting intentional unscrewing or removal of the plug from the socket.

A flange 37 is added to the plug portion 35 of the spike 32 for special purposes herein disclosed. No such flange need be employed if the plug constitutes, say, a simple bolt or screw. In such case the ridges 24 and grooves 25 will be located in corresponding position directly on the head of the bolt or screw or on a shouldered portion of the shank of the bolt underlying the head.

Where the plug involves a spike that is to be removably mounted against a shoe sole, the flange 37 preferably will extend to a sufficiently large diameter to widely overlap the leather surface of the outer sole of the shoe that surrounds the boss 12. In extending flange 37 to such overlapping size I may correspondingly extend the radial lengths of the ridges and grooves. Or, as shown in Fig. 6, there can be provided on flange 37 a circumferentially outer annulus 36 carrying radially disposed ridges that may be disposed in advance planar relation to the socket engaging ridges 24 so that this ridged outer annulus will first contact the leather surface of the outer shoe sole 14 before the inner circle of detent ridges 24 encounters he ridges 33 on the socket. The flange 37 will possess enough springiness to enable the ridges 24 and 33 to be drawn together thereafter into full mutual seating relation as the ridges 36 turn relatively to, and continue to tighten against, the shoe sole. In that way the ridges 36 attain a strong degree of cling to the leather of the shoe sole which further insures against accidental loosening or unscrewing of the spike from the shoe.

For durability against wear, especially in use on hard or abrasive ground surfaces, it is preferred to equip the spike 12 as shown in Fig. 4 with a metal core 40 comprising an exposed head 41 and a mounting shank 42, the latter being roughened or threaded so that it is tightly embedded in the relatively softer plastic material of the plug portion 35 of the spike. This core may be molded in the plastic as an insert. However for use on soft ground such as grass sod the entire spike may consist of plastic such as nylon.

The ridged surfaces 22 and 30 may be correspondingly conical rather than planar. The spike flanges 37 contain holes 38 to accommodate a spanner wrench. The ridges 24 and 33 may be provided on the meeting surfaces of two nuts that are screw mounted on a common bolt shank. These are other obvious variations of the parts herein pictured and described and intended to be included with the definitions of the appended claim.

I claim:

Detentive construction for preventing accidental loosening of screwed together nonmetallic members, comprising, in coaxial screw threaded engagement an axially elongated externally screw threaded plug body of one of said members made of nylon material and an axially elongated socket portion of the other of said members formed by an internally screw threaded tubular wall projecting from and intgeral with a holding plate both made of nylon material, an annular terminal surface transverse said socket portion confined in radial extent to the unwidened thickness of said nylon tubular wall, a mating annular shoulder surface on said plug body disposed to abut against said terminal annular surface when said members are screwed together, said annular surfaces constituting the sole meeting points of said members aside from their mutually engaged screw threads, each of said annular surfaces being ribbed for mutually mating conformation by a series of radially extending alternate grooves and ridges presenting flat surfaces of said nylon material sloping at an angle of approximately 45 degrees in relation to planes containing the common axis of said members and thereby cam-shaped in circumferential cross section, said plug body and said tubular wall of said socket portion having sufficient resilient stretch within their elastic limit in an axial direction to enable the ridges on said nylon surfaces to cam past one another into and out of substantially fully seated relation to said grooves during relative helical movement of said members, whereby a screwed together relationship of said members is yieldingly maintained by the resilient pulling force of the axially stretched stud body and tubular wall.

References Cited in the file of this patent

UNITED STATES PATENTS

| | | |
|---|---|---|
| 1,768,426 | Stelzer | June 24, 1930 |
| 1,945,840 | Wiggin | Feb. 6, 1934 |
| 1,982,588 | Bartel | Nov. 27, 1934 |
| 2,223,794 | Pierce et al. | Dec. 3, 1940 |
| 2,276,887 | Smith | Mar. 17, 1942 |
| 2,292,299 | Smith | Aug. 4, 1942 |
| 2,491,596 | Zaleski | Dec. 20, 1949 |
| 2,608,007 | Shapiro | Aug. 26, 1952 |
| 2,635,363 | Dorgin | Apr. 21, 1953 |
| 2,682,714 | Phillips | July 6, 1954 |
| 2,689,417 | Bernstein | Sept. 21, 1954 |

FOREIGN PATENTS

| | | |
|---|---|---|
| 131,579 | Switzerland | May 1, 1929 |